(12) United States Patent
Andersen (10) Patent No.: US 9,620,752 B2
(45) Date of Patent: Apr. 11, 2017

(54) SPILL-RESISTANT BATTERY COVER AND VENT COVER

(75) Inventor: Glenn W. Andersen, Hartford, WI (US)

(73) Assignee: Johnson Controls Technology Company, Plymouth, MI (US)

( * ) Notice: Subject to any disclaimer, the term of this patent is extended or adjusted under 35 U.S.C. 154(b) by 1268 days.

(21) Appl. No.: 13/144,414

(22) PCT Filed: Jan. 13, 2010

(86) PCT No.: PCT/US2010/020951
§ 371 (c)(1),
(2), (4) Date: Nov. 4, 2011

(87) PCT Pub. No.: WO2010/083258
PCT Pub. Date: Jul. 22, 2010

(65) Prior Publication Data
US 2012/0052348 A1    Mar. 1, 2012

Related U.S. Application Data

(60) Provisional application No. 61/144,277, filed on Jan. 13, 2009.

(51) Int. Cl.
*H01M 2/12* (2006.01)
*H01M 10/06* (2006.01)

(52) U.S. Cl.
CPC ....... *H01M 2/1241* (2013.01); *H01M 2/1217* (2013.01); *H01M 2/1252* (2013.01); *H01M 10/06* (2013.01)

(58) Field of Classification Search
None
See application file for complete search history.

(56) References Cited

U.S. PATENT DOCUMENTS

| | | |
|---|---|---|
| 3,597,280 A | 8/1971 | Hennen |
| 4,306,002 A | 12/1981 | Heiser et al. |
| 4,400,450 A * | 8/1983 | Wagner .......................... 429/86 |
| 5,380,604 A | 1/1995 | Hampe et al. |
| 5,683,830 A | 11/1997 | Fritts et al. |
| 5,830,594 A | 11/1998 | Malay |
| 6,461,758 B1 | 10/2002 | Geibl et al. |
| 6,485,860 B2 | 11/2002 | Fossati et al. |

(Continued)

FOREIGN PATENT DOCUMENTS

| | | |
|---|---|---|
| CN | 101292375 A | 10/2008 |
| CN | 102341934 B | 2/2012 |

(Continued)

OTHER PUBLICATIONS

International Search Report for International Application No. PCT/US10/020951 dated Dec. 28, 2010.

*Primary Examiner* — Barbara Gilliam
*Assistant Examiner* — Robert S Carrico
(74) *Attorney, Agent, or Firm* — Boardman & Clark LLP (57) ABSTRACT

A vented battery cover with a vent cover is disclosed. The vent cover may be capable of attachment to the battery at a first position and a second position using one or more first snap features and one or more second snap features. The vent cover may also provide a fluid path from a fill tube hole in the battery cover to a vent wherein the path is a labyrinth.

18 Claims, 12 Drawing Sheets

(56) References Cited

U.S. PATENT DOCUMENTS

| | | | |
|---|---|---|---|
| 6,686,720 B2 | 2/2004 | Mittal et al. | |
| 6,890,681 B2 | 5/2005 | Mittal et al. | |
| 2004/0142231 A1* | 7/2004 | Schellenberg | H01M 2/043 |
| | | | 429/53 |
| 2006/0166081 A1 | 7/2006 | Sauter et al. | |
| 2008/0032186 A1 | 2/2008 | Muhe | |

FOREIGN PATENT DOCUMENTS

| | | |
|---|---|---|
| EP | 1017119 A1 | 7/2000 |
| EP | 1 596 447 A1 | 11/2005 |
| EP | 1 589 596 B1 | 5/2008 |
| GB | 1 416 639 A1 | 4/1997 |
| JP | 57143261 A | 9/1982 |
| JP | S60-59465 A | 4/1985 |
| JP | H05-101814 | 4/1993 |
| WO | WO 97/15084 A1 | 4/1997 |
| WO | WO 2010/083258 | 7/2010 |

\* cited by examiner

SPILL-RESISTANT BATTERY COVER AND VENT COVER

PRIORITY

This application claims priority to U.S. Provisional Application 61/144,277 filed Jan. 13, 2009, and International Application No. PCT/US2010/020951 both of which are incorporated herein by reference in their entirety.

BACKGROUND

1. Field of the Invention

The present invention relates to a spill-resistant battery cover and manifold or vent cover.

2. Related Art

Exemplary lead acid or other flooded batteries may include a number of lead or lead alloy plates submersed in an aqueous electrolyte (e.g., aqueous sulfuric acid). During a charging and/or a discharging stage of using an exemplary lead acid or other flooded battery, gases may be produced and, in exemplary unsealed lead acid batteries, these gases may need to be vented to an external environment to prevent dangerous conditions (e.g., explosive build up of pressure and/or flammable conditions). Further, various exemplary lead acid batteries and flooded batteries would benefit from covers that allow venting of gasses but prevent or suitably delay leakage of electrolyte that comes into contact with the cover (e.g., during a rollover). Additionally, in various exemplary lead acid or other flooded batteries, the aqueous electrolyte may periodically need to be replenished as the electrolyte and/or water is lost to the above-outlined gassing effect. As such, various exemplary unsealed lead acid or other flooded batteries could benefit from covers that, in addition to allowing proper venting of the gases produced during the charging and/or discharging of the battery, allow electrolyte and/or water to be added to the battery to replace electrolyte and/or water that has been lost to a gassing effect.

OUTLINE OF BASIC AND OTHER ADVANTAGEOUS FEATURES

It would be desirable to provide a battery cover and vent cover or the like of a type disclosed in the present application that includes any one or more of these or other advantageous features:

1. a battery cover and vent cover that allow gases produced within a battery to be safely vented to an external environment;
2. a battery cover and vent cover having reduced costs (e.g., labor and equipment costs) associated with their manufacture and/or materials;
3. a battery cover and vent cover that allow additional electrolyte and/or water to be added to a battery;
4. a battery cover and vent cover that are roll-over compliant;
5. a battery cover and vent cover that will prevent water and/or cleaning products from entering an internal volume of a battery while washing and/or drying an external surface of the battery during manufacture of the battery;
6. a battery cover and vent cover that can be installed to a first position during, or prior to, a cleaning process and can be installed to a second position after the cleaning process;
7. a battery cover and vent cover that can be installed using a simple pushing or pressure applying process;
8. a battery cover and vent cover that utilize a series of baffles and ducts to help limit the advance of an electrolyte of a battery through the battery cover and vent cover when the battery is tilted;
9. a battery cover and vent cover that include a vent cover that is removably coupled to a battery cover; and
10. a battery cover and vent cover that allow cascade fillers and other fillers to provide sufficient acid into cells of the battery within the length/speed of equipment.

SUMMARY

An exemplary embodiment relates to a battery cover comprising one or more fill tube holes defined by a battery cover, a vent cover aligned with the one or more fill tube holes, one or more first snap features on the vent cover, and one or more second snap features on the vent cover.

Another exemplary embodiment relates to a battery comprising one or more fill tube holes defined by a battery cover, a vent cover aligned with the one or more fill tube holes, and a labyrinth in the vent cover between the one more fill tube holes and one or more vents wherein the labyrinth comprises a plurality of projections.

These and other features and advantages of various embodiments of systems and methods according to this invention are described in, or are apparent from, the following detailed description of various exemplary embodiments of various devices, structures, and/or methods according to this invention.

BRIEF DESCRIPTION OF THE DRAWINGS

Various exemplary embodiments of the systems and methods according to the present disclosure will be described in detail, with reference to the following figures, wherein.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Figure 1:
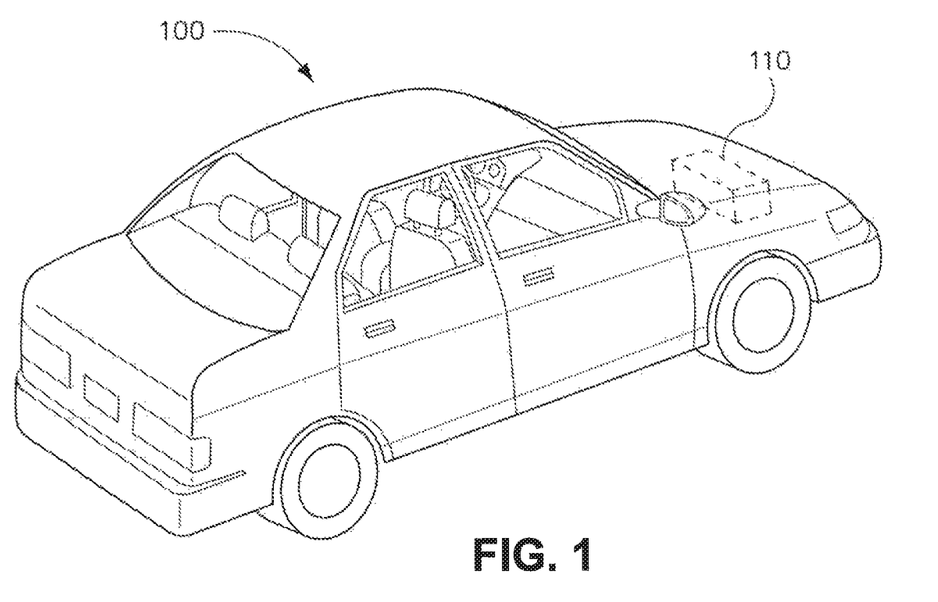
FIG. 1 is a perspective view of a vehicle having a battery according to an exemplary embodiment.

Referring to FIG. 1, a vehicle 100 is shown according to an exemplary embodiment that includes a battery 110. While the vehicle is shown as an automobile, according to various alternative embodiments, the vehicle may comprise a wide variety of differing types of vehicles including, among others, motorcycles, buses, recreational vehicles, boats, and the like. According to an exemplary embodiment, the vehicle uses an internal combustion engine for locomotive purposes. The battery is configured to provide at least a portion of the power required to start or operate the vehicle and/or various vehicle systems (e.g., lighting and ignition systems). It should be understood that, while the battery shown in FIG. 1 is located near the front of the vehicle under a hood of the vehicle, in various other exemplary embodiments, the battery may be located in other positions. For example, in various exemplary embodiments the battery is located in a trunk of the vehicle or in a passenger compartment of the vehicle (e.g., behind the rear seats of the vehicle). Further, it should be understood that according to various exemplary embodiments, the battery may be utilized in a variety of applications not involving a vehicle, and all such applications are intended to be within the scope of the present disclosure.

The battery 110 shown in FIG. 1 may include any type of secondary battery (e.g., rechargeable battery). According to an exemplary embodiment, the battery includes a lead acid battery. Various embodiments of lead acid batteries may be either sealed (e.g., non-maintenance) or unsealed (e.g., wet). According to an exemplary embodiment, the lead acid battery is an unsealed lead acid battery and periodically requires the addition of electrolyte and/or water to maintain a desired volume and/or concentration of either or both.

Figure 2:
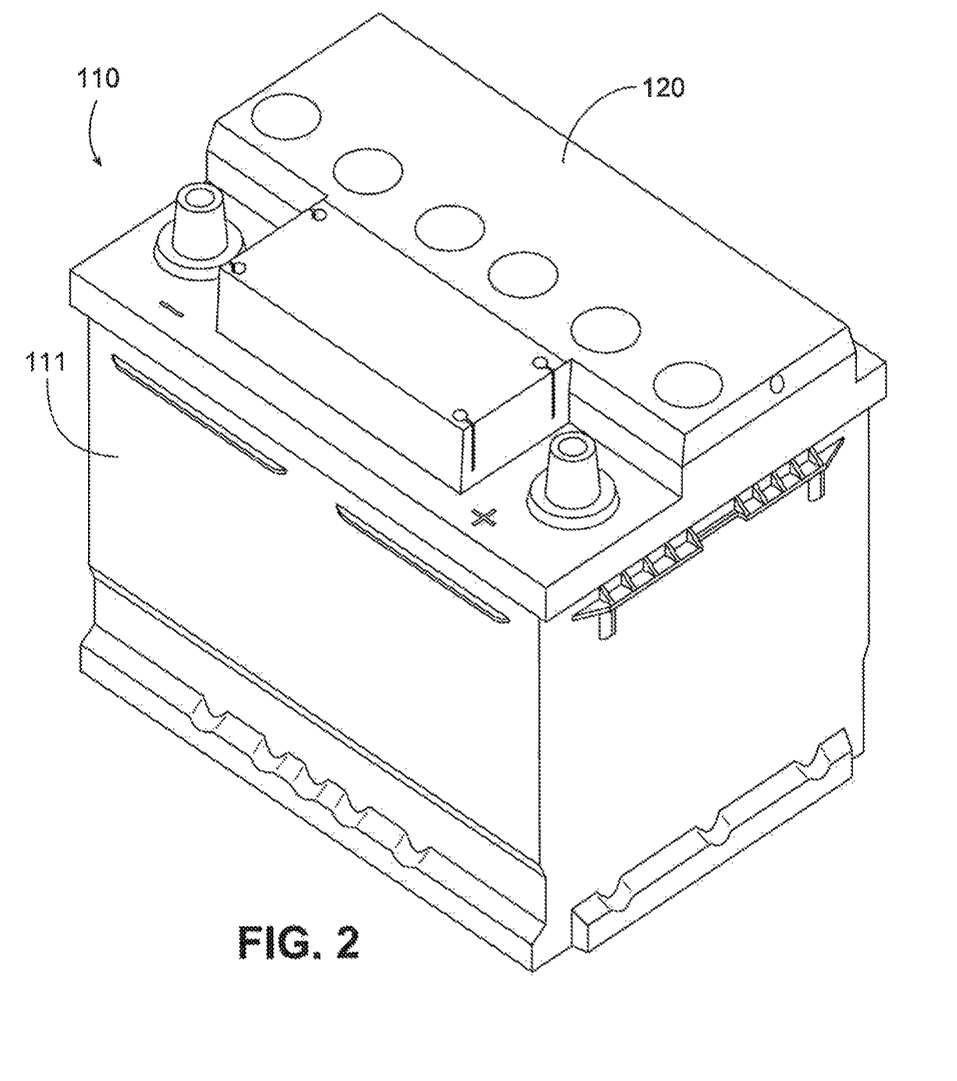
FIG. 2 is a perspective view of a battery according to an exemplary embodiment.
Figure 16:
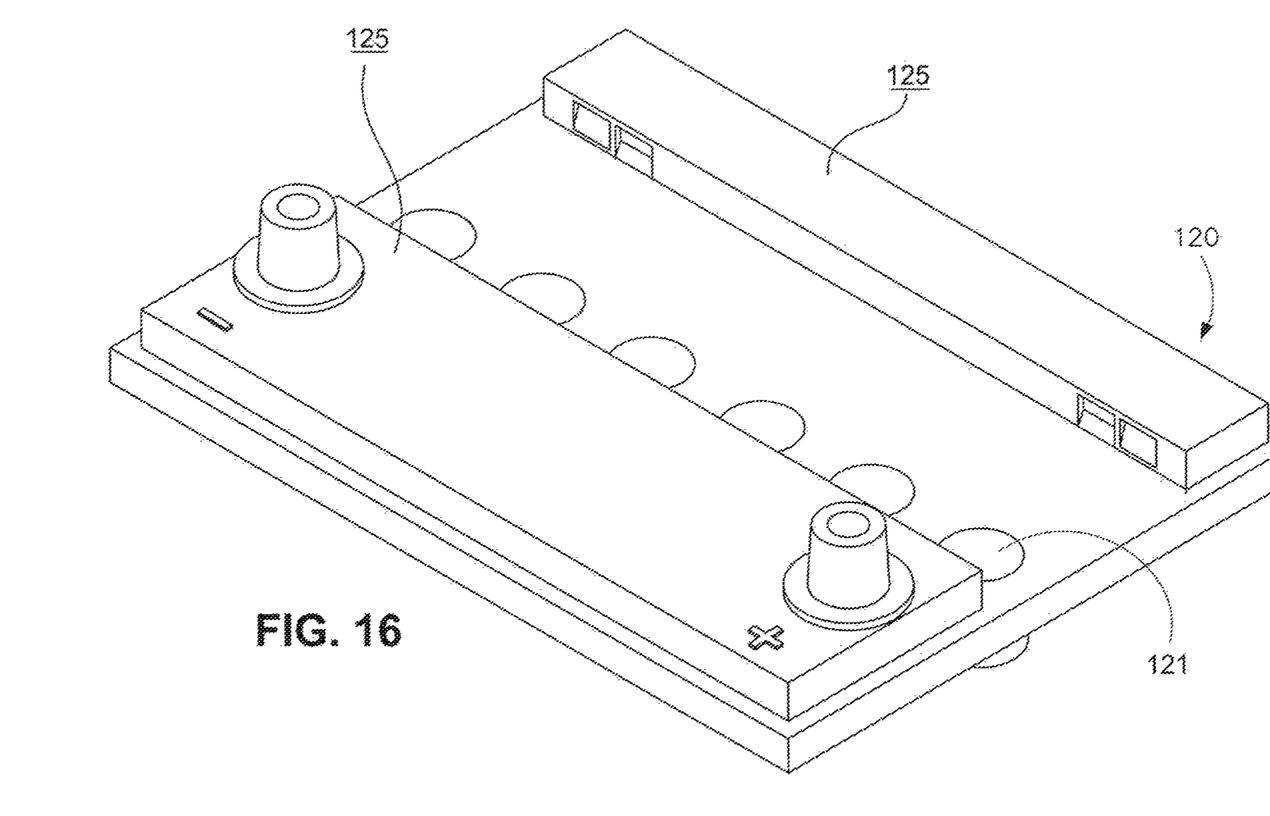
FIG. 16 is an isometric view of a top surface of a battery cover according to an exemplary embodiment.
Figure 17:
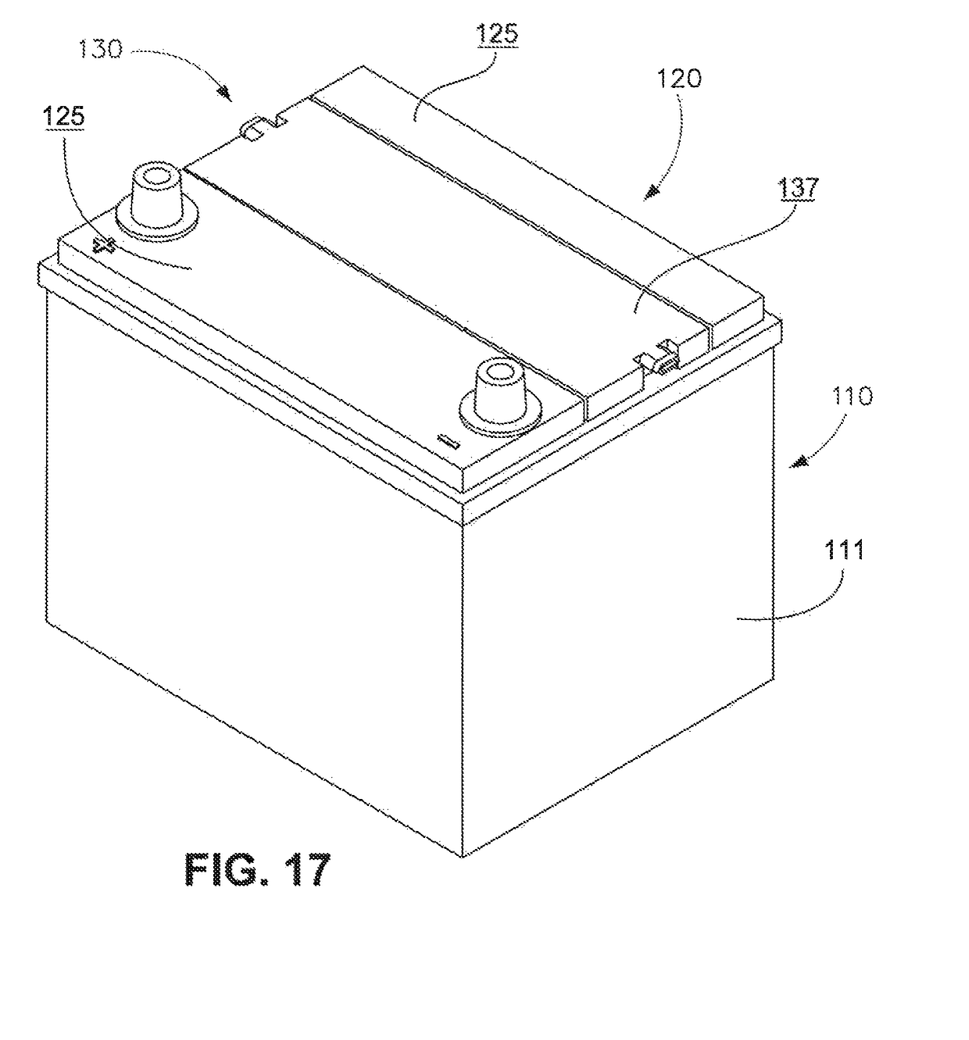
FIG. 17 is an isometric view of a battery and battery cover according to an exemplary embodiment.

In various embodiments, as shown in FIGS. 2 and 17, a battery 110 includes a battery housing 111 including a battery cover 120 defining one or more vent holes 121 (shown in FIGS. 13, 16, and 22) and a vent cover 130 usable to substantially cover the vent holes 121 in the battery cover 120. The one or more vent holes 121 are usable to replenish electrolyte and/or water that have been lost (e.g., due to a gassing effect of the battery). In various embodiments, the battery 110 also includes an aqueous electrolyte (e.g., aqueous sulfuric acid) and a plurality of electrode plates.

In various embodiments, the battery housing 111 contains the aqueous electrolyte and the plurality of electrode plates, which are substantially submerged in the aqueous electrolyte. In various embodiments, the battery housing 111 is filled with the aqueous electrolyte by submerging the battery housing 111 in a container of the aqueous electrolyte. It should be understood that, although the battery housing is shown as being rectangular, any desired shape of battery may be utilized.

In various embodiments, the battery cover 120 includes a top surface, a front side, a first end, and a second end. In various exemplary embodiments, a first terminal post and a second terminal post extend or otherwise protrude from or through the top surface of the battery cover. In various exemplary embodiments, the first terminal post and the second terminal post extend from the top surface of the cover and are positioned substantially near margins (e.g., corners) of the cover. In one exemplary embodiment, the first terminal post and second terminal post are positioned in areas substantially near the intersections of the front edge with the first end and second end.

Figure 13:
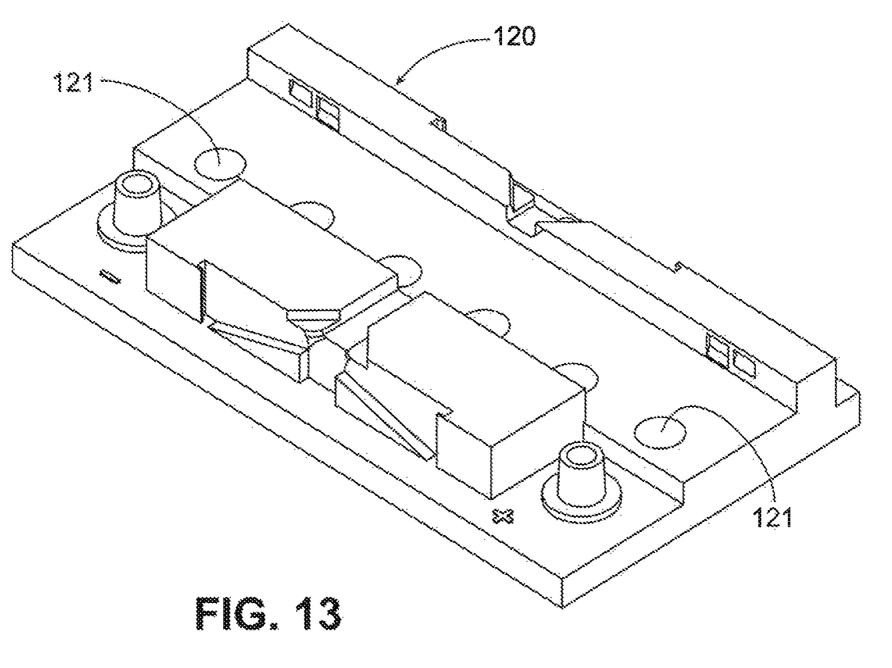
FIG. 13 is an isometric view of a top surface of a battery cover usable with a vent cover according to an exemplary embodiment.
Figure 22:
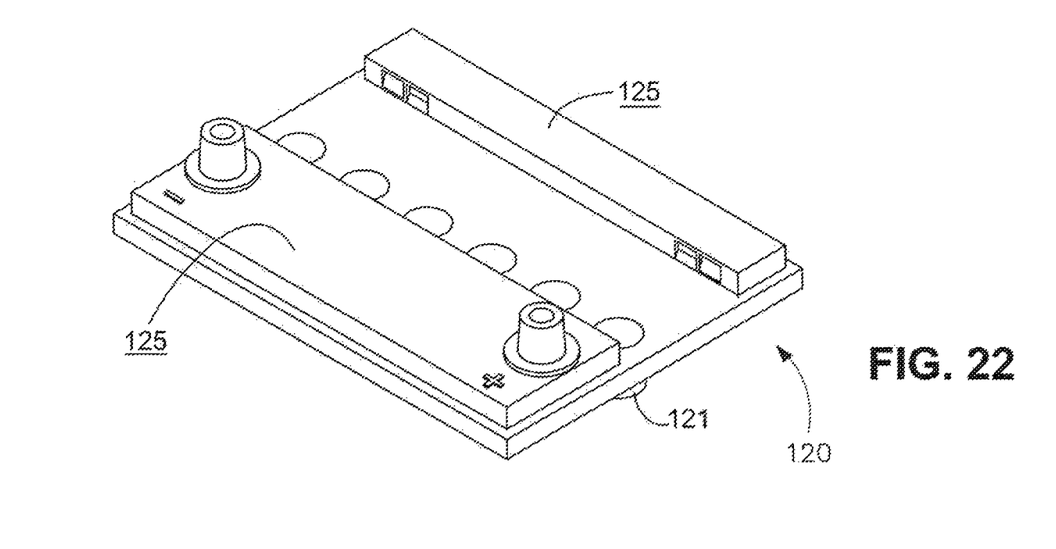
FIG. 22 is an isometric view of a battery cover according to an exemplary embodiment.

In various embodiments, as shown in FIGS. 13, 16, and 22, one or more vents 121 may also be provided in the battery cover 120 to help allow gases to be released from the battery.

In various embodiments, each vent 121 is located along the margin of the cover. In one embodiment, a first vent is located near the first end of the vent cover 130 and a second vent is located near the second end of the vent cover 130.

In various embodiments, one or more fill tube holes 123 (shown in FIG. 8) may also be provided in the battery cover 120 to help allow electrolyte and/or water, which may have been lost as gas released through the one or more vents 121, to be replenished.

In various embodiments, the battery cover 120 may include a vent cover 130 that is usable to cover the one or more fill tube holes 123 in the battery cover 120.

In various embodiments, the vent cover 130 includes one or more vent barrels 131 that are adapted to couple with each of the one or more fill tube holes 123.

In various embodiments, as shown in FIGS. 3-9, the vent cover 130 includes a first snap or series of snaps 132 and a second snap or series of snaps 133, each of which are adapted to interact with recesses provided in the battery cover 120.

In various embodiments, each one or more vent 121 is located in the vent cover 130 and the battery cover 120, when properly coupled to the battery housing, is otherwise at least substantially gas/liquid-tight.

Figures 14, 15:
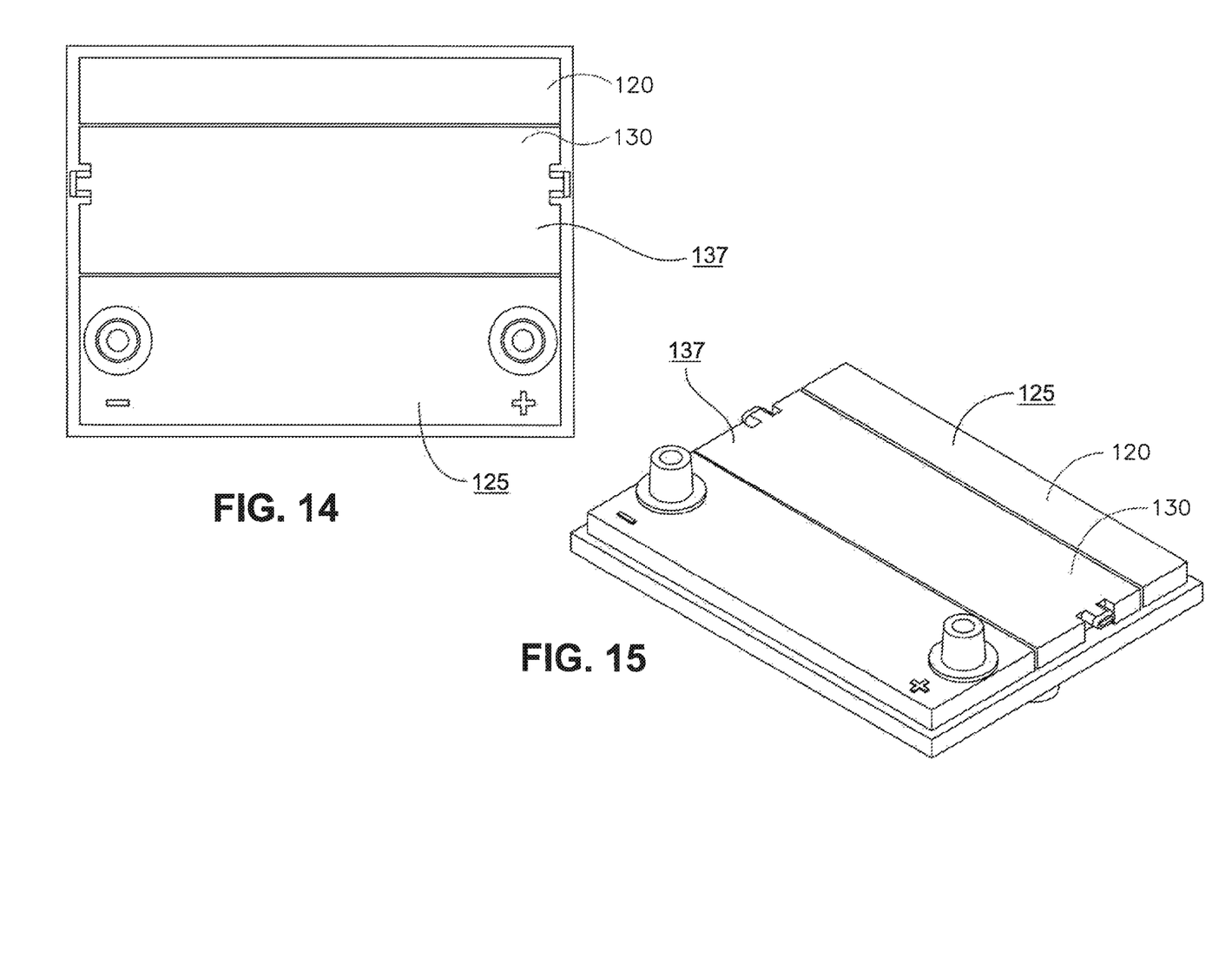
FIG. 14 is a top plan view of a battery cover and vent cover according to an exemplary embodiment.
FIG. 15 is an isometric view of a top surface of an assembled battery cover and vent cover according to an exemplary embodiment.

In various embodiments, the vent cover 130 is installable into and/or onto the battery cover 120 to multiple depths. In various embodiments at a first depth, the one or more fill tube holes 123 are sealed to a height above a top surface of the battery cover 120 and substantially all of the top surface of the battery cover 120 is exposed to an outside environment. In various embodiments at a second depth, a top surface 137 of the vent cover 130 is substantially flush with at least part of the top surface 125 of the battery cover 120, as shown in FIGS. 14 and 15.

Figure 18:
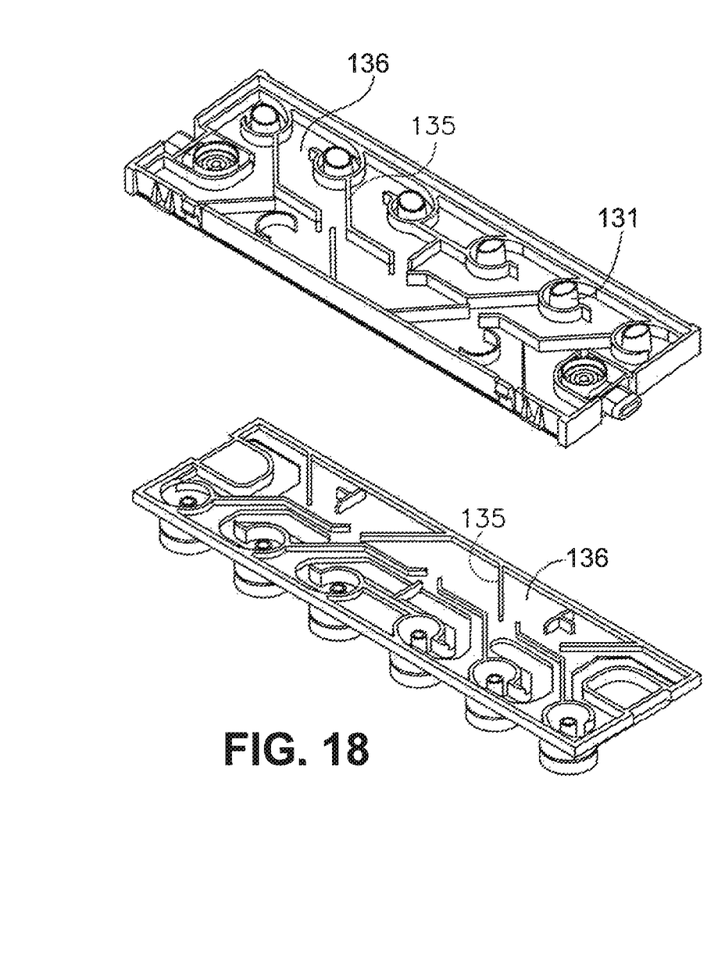
FIG. 18 is an exploded isometric view of a top portion and a bottom portion of a vent cover according to an exemplary embodiment.
Figure 19:
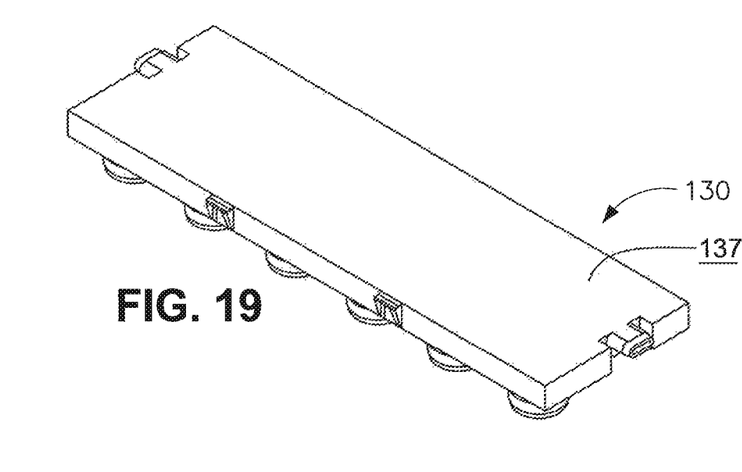
FIG. 19 is an isometric view of a top surface of a vent cover according to an exemplary embodiment.
Figure 20:
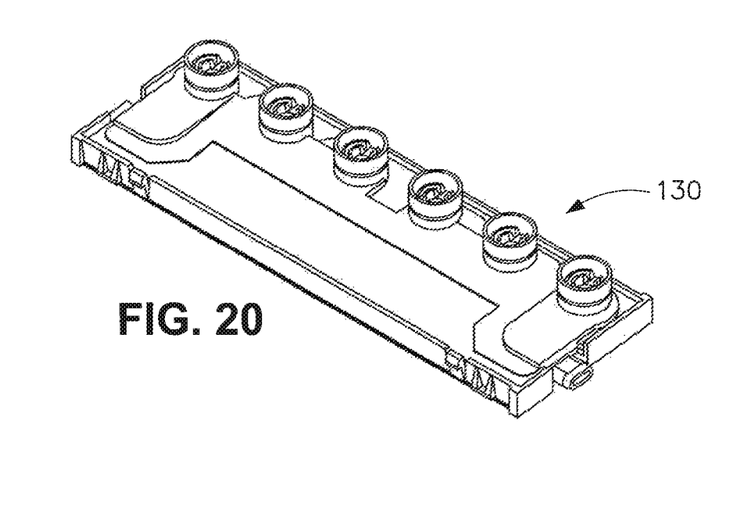
FIG. 20 is an isometric bottom view of a vent cover.
Figure 21:
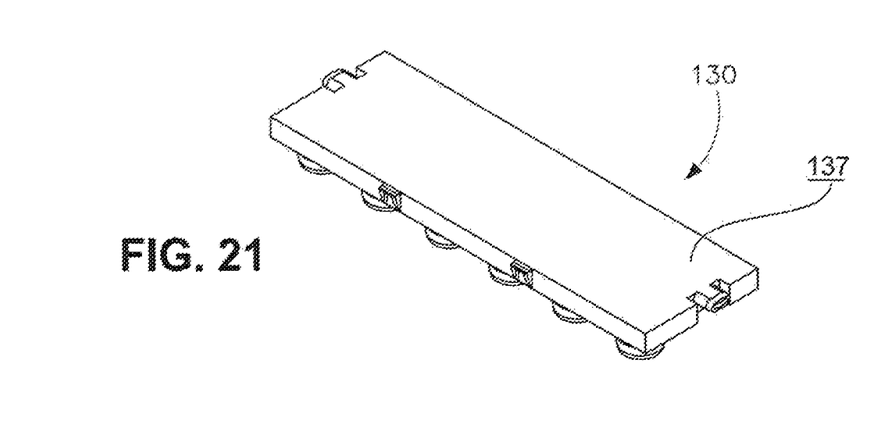
FIG. 21 is an isometric view of a top surface of a vent cover according to an exemplary embodiment.

The vent cover 130 may be usable to allow gas to escape the battery housing but may help prevent the release of the aqueous electrolyte. To this effect, in various embodiments, as shown in FIG. 18, the vent cover 130 may include one or more baffles, ledges, obstructions, and/or other features 135 in a labyrinth-type arrangement. The labyrinth-type arrangement may be utilized to slow or stop the progression of the aqueous electrolyte as the aqueous electrolyte enters the vent cover (e.g., when the battery is in a non-upright or inverted position (e.g., tilted, turned, flipped, etc.)).

The vent cover 130 may also include attachment features for connecting port tubes or similar structures to help direct gasses, which escape from the battery housing, to an external environment, which is located a distance from the battery 110.

In various embodiments, during the manufacture of a lead acid battery, acidic electrolyte fluid (e.g., aqueous sulfuric acid) is provided in a battery housing of the battery. This process may include submerging the battery housing, including a battery cover and one or more electrodes, in the acidic electrolyte fluid in order to fill the battery housing with the acidic electrolyte fluid through one or more fill tube holes provided in the battery cover. After removing the submerged battery housing from the acidic electrolyte fluid, residual acidic electrolyte fluid may remain on an outer surface of the battery housing. Further, dust or other debris may also collect on the outer surface of the battery housing. The residual acidic electrolyte fluid and/or other debris on the outer surface of the battery housing may be removed in a washing step.

Figure 3:
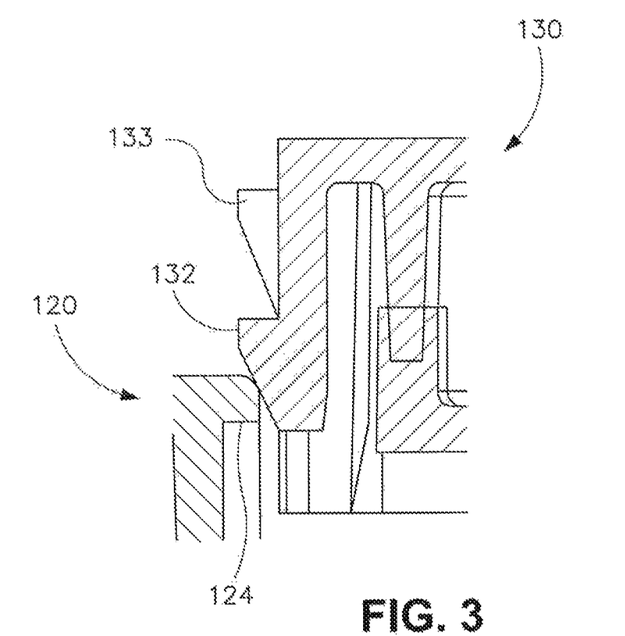
FIG. 3 is a detailed view of a first portion of a vent cover and a battery cover according to an exemplary embodiment.
Figure 4:
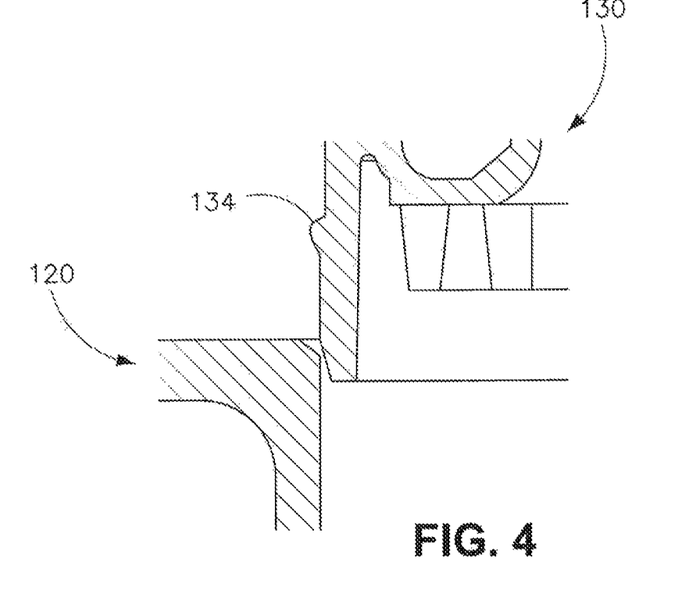
FIG. 4 is a detailed view of a second portion of the vent cover and battery cover of FIG. 3.

As shown in FIGS. 3-4, in various embodiments, a vent cover 130 is initially provided on top of a battery cover 120 and aligned with one or more fill tube holes 123 defined by the battery cover 120. As shown in FIG. 3, in various embodiments, when the vent cover 130 is in this position, the vent cover 130 rests on one or more first snap features 132 and one or more vent barrels 131 are aligned with the one or more fill tube holes 123 provided in the battery cover, which are shown in greater detail in FIG. 4. In various embodiments, a battery, including a battery cover, may be submerged into and/or filled with an electrolyte fluid and then the vent cover may be provided on the battery cover as shown in FIGS. 3-4.

Figure 5:
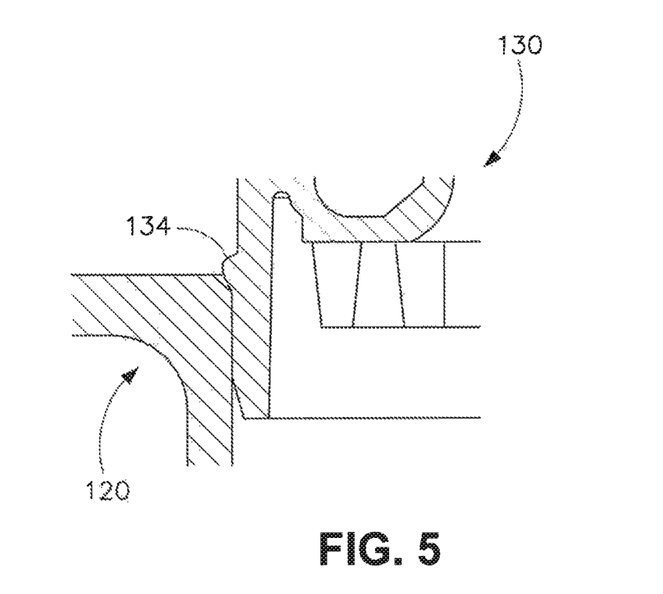
FIG. 5 is a detailed view of a first portion of a vent cover and a battery cover according to an exemplary embodiment.
Figure 6:
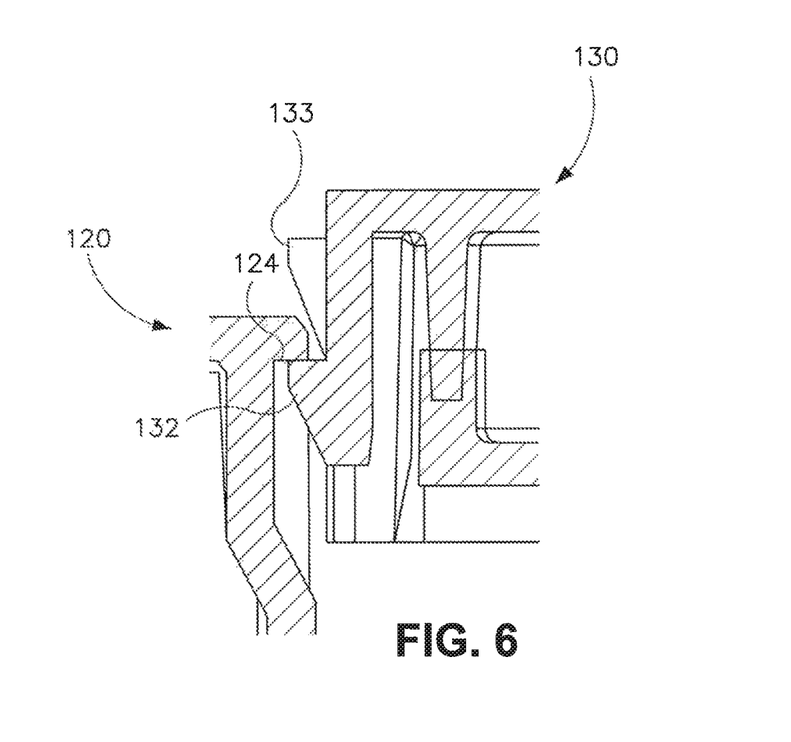
FIG. 6 is a detailed view of a second portion of the vent cover and battery cover of FIG. 5.

In various embodiments, after the vent cover 130 has been provided and/or aligned on the battery cover 120, as shown in FIGS. 3-4, and before the battery housing is washed as outlined above, the vent cover 130 may be installed onto and/or into the battery cover 120 to a first depth or position. An exemplary embodiment of a vent cover 130 installed on a battery cover 120 to this first depth or position is shown in FIGS. 5-6. As shown in detail in FIG. 5, in various embodiments, the vent cover 130 may be installed to a point at which a first snap or series of snaps 132 mates with or is introduced into a recess or recesses defined in the battery cover 120. These first snap(s) 132 help assure that the vent cover 130 is not inadvertently removed from the battery cover 120 and that a sufficient seal is maintained between the one or more vent barrels 131 and the one or more fill tube holes 123, as shown in greater detail in FIG. 6. In various embodiments, a projecting ring 134 provided on each of the one or more vent barrels 131 helps seal the one or more vent barrels 131 and the one or more fill tube holes 123. As shown in FIG. 5, each projecting ring 134 is provided or positioned on an outer edge of each of the one or more fill tube holes 123. In various embodiments, each projecting ring 134 is made of a rubber. In various embodiments, each projecting ring 134 is made of a material used to make the one or more vent barrels 131.

In various embodiments, when the vent cover 130 is installed to the first position shown in FIGS. 5-6, a leak resistant seal is provided between an inner volume of the battery housing and the environment, at least to a position sufficient for washing the outer surface of the battery housing. The battery housing may then be washed by, for example, submerging the battery housing in a washing fluid to a depth that covers the entirety of the battery housing, including the battery cover, but does not cover the top of the vent cover or any apertures (e.g., gas vents) in the vent cover. Alternatively, the battery housing may be washed using, for example, a series of sprayers and/or brushes. The battery housing may be washed, for example, to remove excess electrolyte fluid and debris that remains on the outer surface of the battery housing after filling the battery housing with the electrolyte fluid as outlined above.

Figures 7, 8, 9:
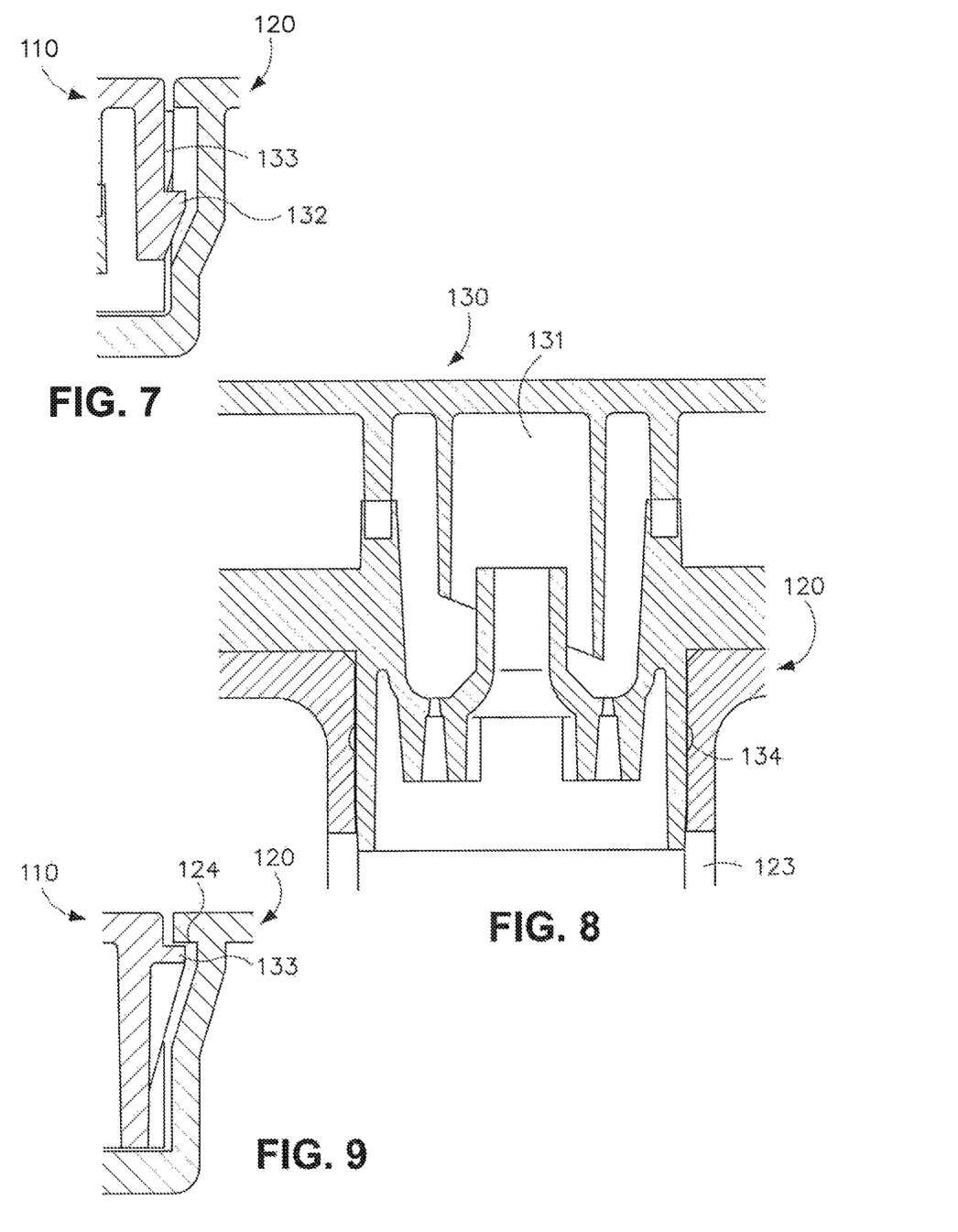
FIG. 7 is a cross-sectional view of a portion of a battery cover and a portion of a vent cover installed in the battery cover according to an exemplary embodiment.
FIG. 8 is a cross-sectional view of a portion of a top portion and a portion of a bottom portion of a vent cover and a portion of a battery cover according to an exemplary embodiment.
FIG. 9 is a cross-sectional view of a portion of a battery cover and a portion of a vent cover installed in the battery cover according to an exemplary embodiment.

In various embodiments, after the battery housing has been washed, the vent cover 130 may be installed to a second depth or position. An exemplary embodiment of a vent cover 130 installed on a battery cover 120 to this second depth or position is shown in FIGS. 7-9. As shown in FIG. 8, in various embodiments, when the vent cover 130 is installed to the second depth or position, a top surface 137 of the vent cover 130 is substantially flush with at least a portion of a top surface 125 of the battery cover 120. As shown in FIG. 9, in various embodiments, when the vent cover 130 is provided to the second depth or position, a second snap or series of snaps 133 is mated with or introduced into a recess or recesses 124 in the battery cover 120. As shown in FIG. 7, in various embodiments, when the vent cover 130 is provided to the second depth, the first snap(s) 132 extend beyond the recess or recesses 124 they previously engaged at the first depth. As shown in FIG. 8, the one or more vent barrels 131 are provided into the one or more fill tube holes 123 defined by the battery cover 120 and the projecting rings 134 of the one or more vent barrels 131 help provide a liquid-tight and/or gas-tight seal between the projecting rings 134 and the inner walls of the one or more fill tube holes 123.

Figure 10:
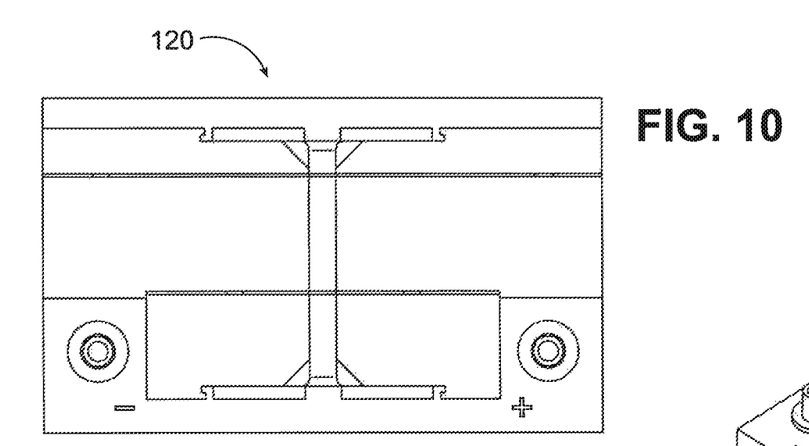
FIG. 10 is a top plan view of a vent cover properly aligned on a battery cover according to an exemplary embodiment.
Figure 11:
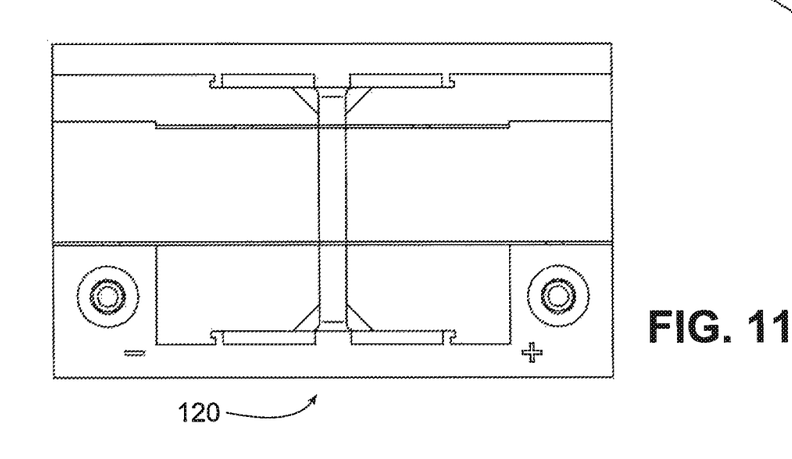
FIG. 11 is a top plan view of a vent cover improperly aligned on a battery cover according to an exemplary embodiment.
Figure 12:
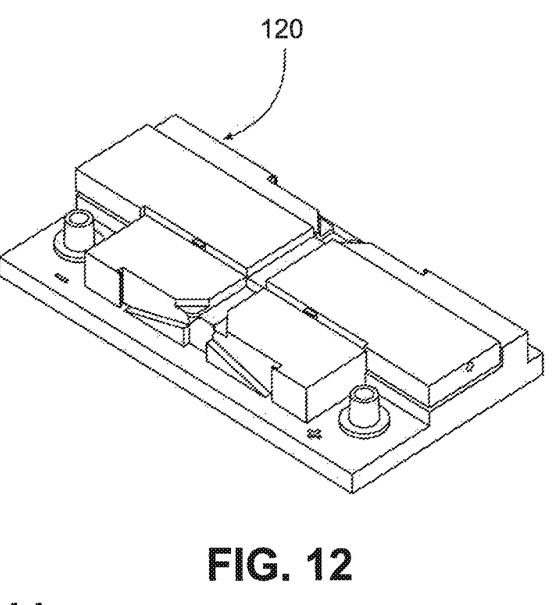
FIG. 12 is an isometric view of a vent cover properly aligned on a battery cover according to an exemplary embodiment.

In various embodiments, to lead to proper alignment of the vent cover 130 on the battery cover 120, the vent cover 130 and/or battery cover 120 may include keyed features or projections that only permit the vent cover 130 to be installed in the proper alignment. For example, as shown in FIGS. 10-12, in various embodiments, the vent cover 130 may have a recessed portion that couples with a projection from the battery cover 120 when the vent cover. 130 is properly aligned. FIGS. 10 and 12 show an exemplary embodiment of the vent cover 130 properly aligned with the battery cover 120. The called-out corners of the vent cover 130 and battery cover in FIGS. 10 and 12 are interfacing properly. FIG. 11 show an exemplary embodiment of the vent cover 130 improperly aligned with the battery cover 120 (e.g., the corners of the vent cover 130 are interfering with the battery cover 120 and the corners of the battery cover 120 are interfering with the vent cover 130).

It should be appreciated that the vent cover may be removed for various reasons during the above-outlined exemplary manufacturing process. In various embodiments, the vent cover may be removed after the vent cover is installed to the above-outlined first depth or position and before the vent cover is installed to the above-outlined second depth or position to, for example, add additional water and/or electrolyte after an initial charging process. In various embodiments, the first clip or set of clips are releasable from outside the battery housing to aid in removal of the vent cover from the first depth or position, while the second clip or set of clips may further secure the vent cover to the battery cover when installed to the second depth or position.

It should also be appreciated that, in various embodiments, the vent cover may be utilized to replace a temporary cover, which may be installed before or during the above-outlined washing and/or drying stage, and/or a final cover, which may be installed after the above-outlined washing and/or drying stage. For example, in various embodiments, the vent cover, when provided to the first depth or position, performs the same or similar function as a temporary cover (e.g., helps prevent water and/or cleaning solutions from entering an interior of the battery during a washing and/or drying stage), and when installed to the second depth or position, performs the same or similar function as a final cover (e.g., allows gases to be safely vented and/or prevents electrolyte from spilling or leaking out of the battery).

It should also be appreciated that, in various embodiments, the battery cover and vent cover is roll-over compliant. That is, the battery cover and vent cover may help prevent electrolyte or other liquids from escaping the interior of the battery (e.g., by flowing out of fill tube holes, into the vent cover and/or out the vents) when the battery is in a less-than-optimal position or orientation (e.g., tilted, turned, flipped, etc.). As shown in FIGS. 8 and 18, in various embodiments, the vent cover 130 includes projections 135 such as, for example, baffles and walls. These projections may help guide any fluid (e.g., gases, liquids (e.g., electrolyte)) through a complex labyrinth between the one or more fill tube holes 123 and the vents 121. The labyrinth 136 may help contain the electrolyte within the battery housing and vent cover 130 if the battery 110 is moved from an optimal orientation (e.g., tilted, turned or flipped). The labyrinth may also help guide electrolyte back into the interior of the battery housing when the battery is returned to an upright or optimal position, while allowing gases to vent properly.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the elements of the battery cover and vent cover as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces (e.g. clamps, etc.) may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). It should be noted that the elements and/or assemblies of the system may be constructed from any of a wide variety of materials that provide sufficient strength or durability, in any of a wide variety of colors, textures and combinations. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

What is claimed is:

1. A battery, comprising:
   one or more fill tube holes defined by a battery cover;
   a vent cover adapted to align with the one or more fill tube holes;
   one or more first snap features on the vent cover;
   one or more second snap features on the vent cover; and
   one or more recesses formed on the battery cover;
   wherein each one or more first snap features is adapted to mate with the one or more recesses when the vent cover is installed on the battery to a first depth viewed from the top surface of the vent cover when the battery is in an upright position; and
   wherein each one or more second snap features is adapted to mate with the one or more recesses when the vent cover is installed on the battery to a second depth that is different from the first depth.

2. The battery of claim 1 wherein, when the vent cover is in the second depth, the one or more first snap features extend beyond the one or more recesses mated by the one or more first snap features when the vent cover is in the first depth.

3. The battery of claim 1 wherein a top surface of the vent cover is substantially flush with at least a portion of a top surface of the battery cover when the vent cover is in the second depth.

4. The battery of claim 1 wherein the one or more snap features and one or more recesses to allow the vent cover to be installed onto and removed from the battery cover.

5. The battery of claim 1, further comprising a leak resistant seal between an inner volume of the battery and the environment.

6. The battery of claim 1, further comprising:
one or more vent barrels in the vent cover; and
a projecting ring on at least one of the one or more vent barrels;
wherein the vent barrels are provided into the one or more fill tube holes and the projecting rings help provide a liquid-tight seal between the projecting ring and the inner walls of the one or more fill tube holes.

7. The battery of claim 1, further comprising including one or more keyed features to permit only properly aligned installation of the vent cover.

8. The battery of claim 7 wherein the keyed features comprise a recessed portion on the vent cover and a projection on the battery cover that mate when the vent cover and battery cover are properly aligned.

9. The battery of claim 1, further comprising:
one or more vents provided on the vent cover;
one or more vent barrels provided on the vent cover so as to be provided into the one or more fill tube holes when the vent cover is attached to the battery cover and
a labyrinth disposed in the vent cover between the one or more fill tube holes and the one or more vents wherein the labyrinth is formed by a plurality of baffles, ledges, or obstructions, and wherein the labyrinth surrounds the one or more vent barrels, so as to keep electrolyte within the battery housing and the vent cover when the battery is moved and to guide the electrolyte into the battery housing.

10. The battery of claim 9 wherein, when the vent cover is in the second position, the one or more first snaps extend beyond the one or more recesses mated by the one or more first snaps when the vent cover is in the first position.

11. The battery of claim 9 wherein a top surface of the vent cover is substantially flush with at least a portion of a top surface of the battery cover when the vent cover is in the second depth.

12. The battery of claim 9 wherein a mating arrangement of the first snap features, the one or more second snap features, and the one or more recesses permit the vent cover to be installed onto and removed from the battery cover.

13. The battery of claim 9, further comprising a leak resistant seal between an inner volume of the battery and the environment.

14. The battery of claim 9, further comprising:
a projecting ring on at least one of the one or more vent barrels;
wherein the vent barrels are provided into the one or more fill tube holes and the projecting rings help provide a liquid-tight seal between the projecting ring and the inner walls of the one or more fill tube holes.

15. The battery of claim 9, further comprising including one or more keyed features to permit only properly aligned installation of the vent cover.

16. The battery of claim 15 wherein the keyed features comprise a recessed portion on the vent cover and a projection on the battery cover that mate when the vent cover and battery cover are properly aligned.

17. The battery of claim 1 wherein the one or more first snap features allow the vent cover to be installed to a first position at which point the one or more first snap features mate with the one or more recesses in the battery cover.

18. The battery of claim 17 wherein the one or more second snap features allow the vent cover to be installed to a second position at which point the one or more second snap features mate with the one or more recesses in the battery cover.

* * * * *

UNITED STATES PATENT AND TRADEMARK OFFICE
CERTIFICATE OF CORRECTION

PATENT NO. : 9,620,752 B2
APPLICATION NO. : 13/144414
DATED : April 11, 2017
INVENTOR(S) : Glenn W. Andersen Page 1 of 1

It is certified that error appears in the above-identified patent and that said Letters Patent is hereby corrected as shown below:

In the Claims

In Column 9, Line 32, delete "position," and insert -- depth, -- therefor.

In Column 9, Line 34, delete "position." and insert -- depth. -- therefor.

Signed and Sealed this
Third Day of October, 2017

Joseph Matal
*Performing the Functions and Duties of the
Under Secretary of Commerce for Intellectual Property and
Director of the United States Patent and Trademark Office*